United States Patent [19]

Maruyama

[11] 4,380,770

[45] Apr. 19, 1983

[54] INK JET PRINTER

[75] Inventor: Mitsuaki Maruyama, Shiojiri, Japan

[73] Assignees: Epson Corporation; Kabushiki Kaisha Suwa Seikosha, both of Japan

[21] Appl. No.: 208,743

[22] Filed: Nov. 20, 1980

[30] Foreign Application Priority Data

Nov. 22, 1979 [JP] Japan ..... 54-151823

[51] Int. Cl.3 ..... G01D 15/18

[52] U.S. Cl. ..... 346/140 R

[58] Field of Search ..... 346/140 R, 75

[56] References Cited

U.S. PATENT DOCUMENTS

| | | | |
|---|---|---|---|
| 3,346,869 | 10/1967 | Stone | 346/75 |
| 3,747,120 | 7/1973 | Stemme | 346/75 |
| 3,946,398 | 3/1976 | Kyser et al. | 346/1 |
| 3,974,508 | 8/1976 | Blumenthal | 346/140 R |
| 4,007,465 | 2/1977 | Chaudhary | 346/140 R |
| 4,015,272 | 3/1977 | Yamamori et al. | 346/140 R |
| 4,045,802 | 8/1977 | Fukazawa | 346/140 R |
| 4,074,284 | 2/1978 | Dexter et al. | 346/140 R |
| 4,123,761 | 10/1978 | Kimura et al. | 346/140 R |
| 4,126,868 | 11/1978 | Kirner | 346/140 R |
| 4,144,537 | 3/1979 | Kimura | 346/140 |
| 4,184,169 | 1/1980 | Taylor | 3456/140 R |

OTHER PUBLICATIONS

Brownlow et al., Ink on Demand using Silicon Nozzles; IBM TDB, vol. 19, No. 6, Nov. 1976, pp. 2255–2256.

*Primary Examiner*—Joseph W. Hartary

*Attorney, Agent, or Firm*—Blum, Kaplan, Friedman, Silberman and Beran

[57] ABSTRACT

An ink jet printer includes pumped-forced circulation of ink through the printer head and a nozzle cap which together eliminate gas from the ink supply and overcome ink stagnation which adversely affect printing quality. Ink from a tank circulates through the printer head and returns to the tank while the nozzles are capped. A brief flow of ink from the nozzles completes a purging of the head prior to printing.

18 Claims, 8 Drawing Figures

FIG. 6
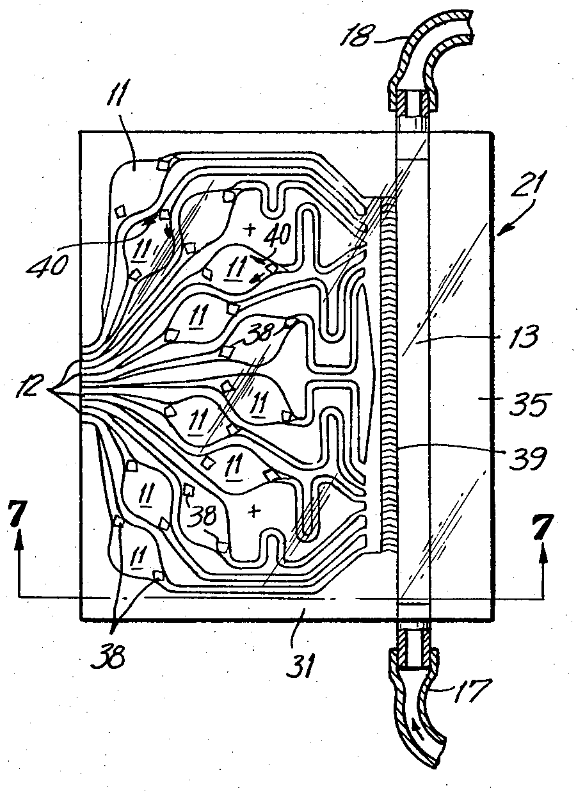
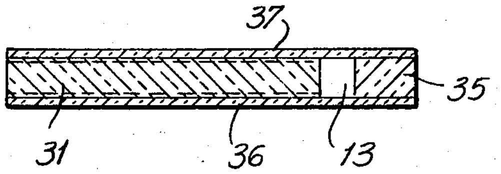
FIG. 7

INK JET PRINTER

BACKGROUND OF THE INVENTION

This invention relates generally to an ink jet printer of the type which provides ink on demand and more particularly to an ink jet printer where provision is made to eliminate gas from the ink supply and to overcome the effects of stagnating ink. The jet printer performs by ejecting ink droplets from a nozzle directly on to a recording medium such as paper. Many variations of ink jet printers have been suggested and some have been put into practice. As is well known, methods for printing by ink jet can be classified into two major groups. In a first method, ink is provided continuously as regular particles which are given an electrical charge. The charged particles are passed through an electrostatic field and deflected so as to form characters on the print medium. In the other method, ink is stored in an ink chamber having a side wall capable of deflection. In response to an electric pulse, the wall is abruptly deflected so as to reduce the internal volume of the ink chamber. The pressurized ink in the chamber is ejected from a small nozzle towards the recording medium. As a result, printing is accomplished on the medium in this on-demand type which is illustrated by U.S. Pat. No. 3,946,398.

Electrostatic deflection has several disadvantages, for example, the means for producing regular ink particles to be electrically charged is complicated. High voltage is needed for deflection of the charged particles and this equipment unfailingly uses more ink than is necessary to record the characters on the printed medium. As a result, the printing apparatus becomes large and complicated. Nevertheless, this method is nearing perfection and almost all printers currently in production are based on this method.

On the other hand, the method using the deflecting plate ejects ink in response to an electric pulse only as the ink is required. Accordingly, ink is never wasted in the printing process and printing is effective. Moreover, the voltage used for deflecting the wall is not high and as a result the apparatus is greatly simplified, small-sized, and a lower priced printer can be obtained. However, relatively few printers are produced using this method, and such printers have not been considered to be perfected.

An embodiment of a prior art printer using the deflecting wall method is shown in FIG. 1. A common ink chamber 2, pressure chamber 3 and nozzles 4 are formed as shallow depressions or grooves on a glass substrate 1 by etching or other means. Piezoelectric elements 5 are disposed in registry with the pressure chambers 3. By applying electrical pulses to the piezoelectric elements 5 with timing in accordance with printing signals, the piezoelectric elements 5 deflect inwardly to reduce the volume of the pressure chamber 3, thereby raising the hydraulic pressure of the liquid ink in the pressure chamber 3. As a result of the pressurization of the ink chamber, ink is ejected from the nozzle 4. Each nozzle 4 is capable of independent control by means of the individual piezoelectric elements 5.

Ink is ejected from a nozzle 4 only upon the application of any electric pulse to the associated piezoelectric element. Therefore, ink is never ejected without purpose in printing. The apparatus is much simpler than a printer using electrostatic deflection of ink particles.

However, some problems occur such as the irregular ejecting of ink or the clogging of ink in the vicinity of the nozzles 4. In view of the operating principles, it should be apparent that if the hydraulic pressure in the ink pressure chamber 3 is not sufficiently increased by the wall deflection, ink will not be uniformly ejected. This problem can arise when some gas bubbles, generally air, are mingled in the ink in the vicinity of the pressure chamber 3. When the pressure chamber wall is deflected, because the modulus of elasticity of a gas bubble is extremely less than that of the ink, the gas is compressed but the pressure of the fluid is not substantially increased. In other words, the gas is substantially more compressible than the liquid and the energy of deflection in the pressure chamber wall is absorbed in compressing the gas. Clogging is likely to occur because the diameter of the nozzle is extremely small and the hydraulic pressure at the time of ink ejection is less than that of the former method.

The problem of clogging has been resolved to a certain degree by using a cap over the tip of the nozzle. However, the cap mechanism are often complicated. Thus, in the prior art a perfect counter measure for the entrapment and mingling of bubbles has not yet been perfected. Therefore, the ink on-demand type printer has been delayed in achieving widespread use in practical applications.

With regard to the mingling of bubbles in the ink, there are several conditions which cause the formation or entrapment of bubbles. At the initial filling of the supply tank with ink, if there are some places where ink is apt to stagnate, the filling cannot be completed. Therefore, bubbles remain. There are also reasons attributable to the printer head construction. For example, a double cavity type printer head such as disclosed in U.S. Pat. No. 3,747,120, wherein the ink chamber is divided into two portions, has a disadvantage in that initial filling with ink cannot be perfectly completed. Consequently, in future printer head designs, the ink chamber should be constructed so as to be easily filled with ink when starting up or replenishing the ink supply. Also, there are conditions whereby bubbles are sucked in through the nozzles 4 during operation by getting a physical shock, or for other reasons. Bubbles can be absorbed by the evaporation of ink through the wall of the tube which connects the ink tank to the printer head and air can then permeate the tube from the outside into the ink supply. Also, when changing the ink cartridge, bubbles are frequently mixed at the point of connection.

For all these conditions, simple and logical means are needed for excluding bubbles if a printer of the ink on-demand type is to be put into widespread usage. In the prior art printers, some measures for the prevention of bubble mingling have been suggested, such as preventing an improper initial ink fill, preventing gas mingling when the ink cartridge is exchanged, and it has also been suggested to use degassed ink for filling the supply tank. However, at the conditions just described, it is nearly impossible to prevent some bubble intermingling.

The means for ink replenishment in the double cavity type of print head is extremely complicated (U.S. Pat. No. 4,015,272). Other devices provide a bubble trap along the length of the ink delivery tube, however, the mechanism becomes large and complicated and has little effect against minute bubbles. Another printer provides a means to exclude bubbles by applying pressure on the ink cartridge and ejecting gas bubbles through the nozzles along with ink. However, this is not a suitable approach because much ink is wasted (U.S. Pat. Nos. 4,123,761 and 4,074,284).

In another example, an exhaust mechanism is provided in the head (U.S. Pat. No. 4,126,868), however, ink which stagnates in an upper portion can be sucked into the nozzle, for example, if the head receives a physical shock. Minute bubbles attached to walls of the exhaust tube are difficult to bring to the upper portion, so that much ink is wasted when bubbles are excluded by flowing of ink.

What is needed is an ink jet printer having simple means for excluding bubbles effectively from the ink supply and also to dissolve or remove clogged ink.

SUMMARY OF THE INVENTION

Generally speaking, in accordance with the invention, an ink jet printer especially suitable for high quality printing is provided. The ink jet printer includes a pump which forces circulation of ink through the printer head when filling the ink supply tank or replenishing the ink supply. A nozzle cap blocks the nozzles and prevents ink flow when the pump pressurizes the ink supply system except when it is desired to force ink from the nozzles in a procedure to eliminate clogging of the ink nozzles. The forced circulation of ink in the print head drives entrapped gas bubbles back to the supply tank where they may be vented. The ink cap also serves to wipe clogged ink from the nozzle outlets.

Accordingly, it is an object of this invention to provide an improved ink jet printer having simple means for eliminating gas bubbles from the ink supply.

Another object of this invention is to provide an improved ink jet printer having means to remove clogged ink from the print head nozzles.

A further object of this invention is to provide an improved ink jet printer having means for removing entrapped gases due to replenishment of the ink supply and to an exchange of the ink cartridge.

Still another object of this invention is to provide an improved ink jet printer which includes a cap for the ink jet nozzles.

Still other objects and advantages of the invention will in part be obvious and in part to apparent from the specification.

The invention accordingly comprises the features of construction, combination of elements and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 6 is a detailed side view to an enlarged scale of an ink jet printer head of FIG. 3;

FIG. 7 is a sectional view taken along the lines 7—7 of FIG. 6; and

DESCRIPTION OF THE PREFERRED EMBODIMENTS

Figure 1:
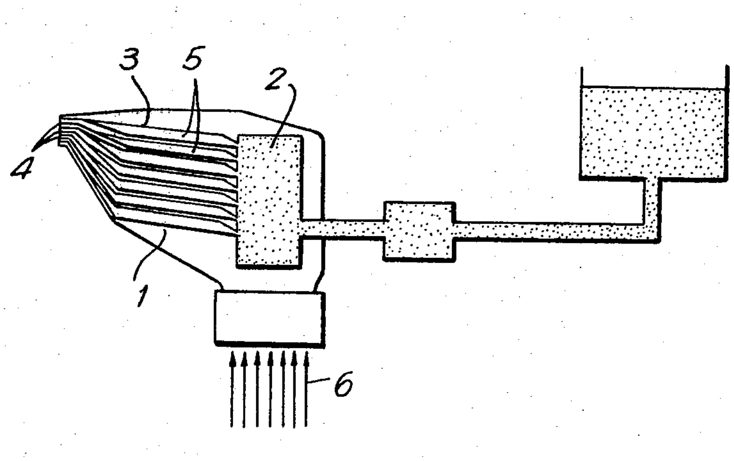
FIG. 1 PRIOR ART
FIG. 1 is a schematic diagram of an ink jet printer head of the prior art.
Figure 2:
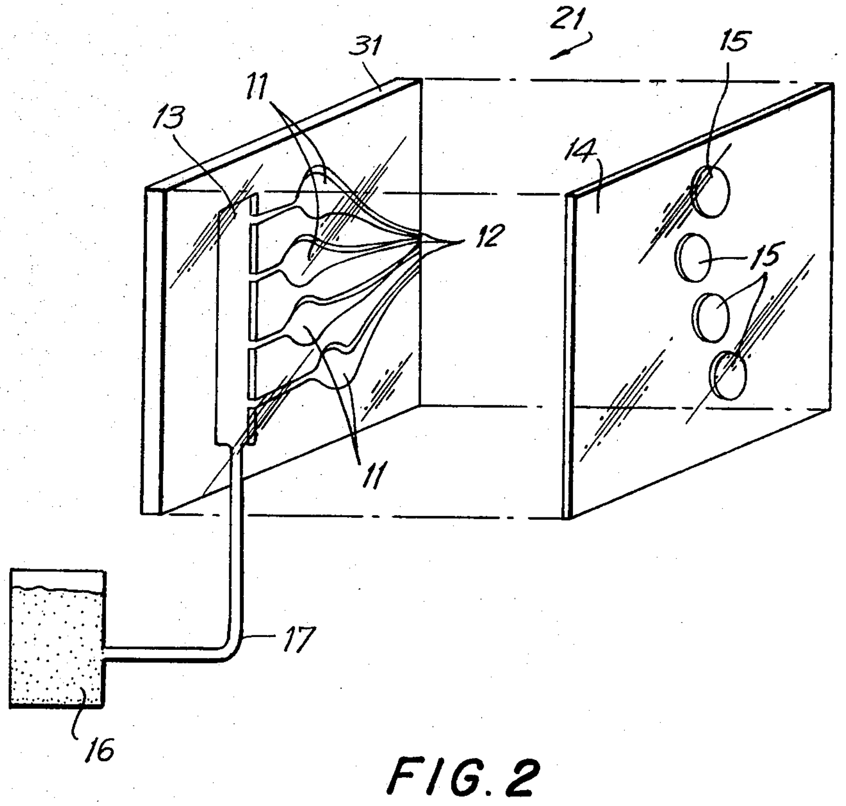
FIG. 2 is an exploded perspective view schematically showing an ink jet print head in accordance with this invention.

FIG. 2 shows an elemental ink on-demand printer head and ink supply. A plurality of pressure chambers 11 are connected to individual ejection nozzles 12, although the principles of this invention can be practiced in a device having only one chamber and connected nozzle. Ink is supplied from the ink reservoir 13 in the print head 21 to the pressure chambers 11. The ink reservoir 13 is a common ink pool which is large in volume in comparison to the volume of the chambers 11. The pressure chambers 11, the nozzles 12 and the ink reservoir 13 may be formed on the same substrate 31 by etching or similar method. Also, it is suitable that the ink reservoir 13 be formed and installed separately in a position up stream of the pressure chambers 11. A deflecting plate 14, whereon piezoelectric elements 15 are positioned, is attached to the substrate 31 in a suitable way such that the deflecting plate 14 comprises one of the walls of the pressure chambers 11. An ink tank 16 furnishes ink to the ink reservoir 13 through a tube 17. Applying voltage pulses to the piezoelectric elements 15 in accordance with printing signals causes the deflecting plate 14 to bend inward and thereby increases the hydraulic pressure of the ink within the selected chamber 11. Then ink is ejected from the connected nozzle 12 and a droplet of ink arrives on a recording paper in the known manner. By translating the print head and the nozzles 12 relative to a recording paper (not shown), character printing on the recording paper is performed.

However, there are fundamental disadvantages in this construction as follows. When gas bubbles, for example, air, exist in a pressure chamber 11, the pressure in the ink caused by deflecting the deflecting plate 14 adjacent to the chamber is absorbed by the bubbles such that the increase in ink pressure is not sufficient to eject ink from the nozzle 12. This occurs as stated above, because the modulus of elasticity of the gas bubbles is extremely less than that of the ink which is a liquid. Consequently, ink ejection from the nozzles 12 becomes impossible as the air bubbles accumulate.

It is generally understood that the reasons for the accumulation of bubbles in the pressure chambers 11 are as follows. First, when ink stored in the ink tank 16 is supplied to the pressure chambers 11 and the nozzles 12 through the the ink reservoir 13 at start-up, ink stagnates in some parts of the ink reservoir 13 especially at the corners. This ink stagnation causes some bubbles to be trapped and these intrude into the pressure chamber 11 upon some chance happening, for instance, such as a physical shock to the printer.

Secondly, air bubbles are absorbed from the tip of the nozzles 12 when the print head gets a physical shock. Further, when exchanging the ink tank 16, some air enters into the tube 17 which connects the ink tank and the ink reservoir 13.

Air also gets into the system by passing through the walls of the tube 17 which connects the ink tank 16 to the ink reservoir 13. The rate of air entry is dependent upon the permeability constant of the material which comprises the tube 17. Then after the solubility of the ink permits entry of no more air, that is, the ink is saturated with air, bubbles come out of the ink for some reason such as a variation in temperature.

As for air entering the chambers 11 and passages through the nozzles 12, this can be resolved by forming the flow channels between the pressure chambers 11 and the nozzles 12 with smooth curves and by applying pressure to the ink tank 16. In this way, stagnated bubbles in the pressure chambers 11 are drained along with ink from the top of the nozzles 12. However, when air bubbles are stagnated in the ink reservoir 13, it is barely possible, if at all, to drain the bubbles even when ink flows through the reservoir 13 at a high speed. In every case, even though it is possible to drain bubbles, a substantial amount of ink will be wasted and additionally a problem remains in the disposition of the ink which flows from the nozzles. Removal of air from the tube 17 can also be accomplished by pressurizing the ink tank 16, however, a large amount of ink is again wasted.

An ink jet printer in accordance with this invention provides a solution to the above-described problems and removes gas bubbles mingled into the ink in the tube 17 and in the ink reservoir 13, in a simple manner. Entry of bubbles into the pressure chambers 11 through the nozzles 12 is also prevented.

Figure 3:
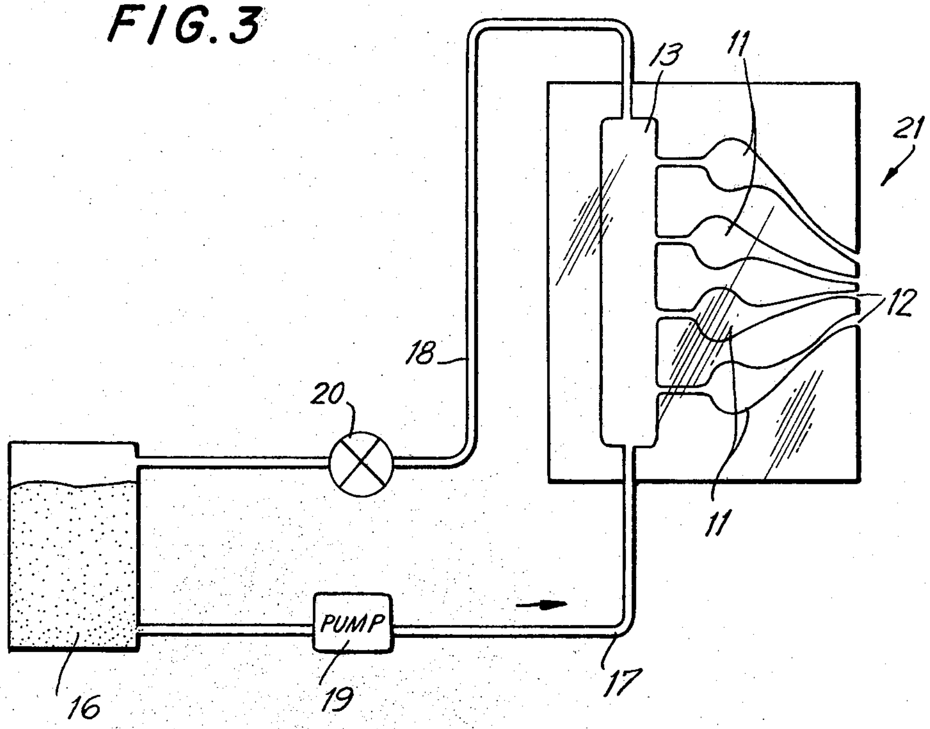
FIG. 3 is schematic diagram of an ink supply system and printer head in accordance with this invention.

A printer head of the ink on-demand type and an ink supply system in accordance with this invention are shown in FIG. 3. Parts common to both FIGS. 2 and 3 have the same reference numerals. The ink reservoir 13 connects to the pressure chambers 11 which in turn are connected to the ejection nozzles 12. A deflecting plate, piezoelectric elements and the ink tank 16 are the same as those in the illustrated embodiment of FIG. 2. The tube 17 supplies ink from the ink tank 16 to the ink reservoir 13 and an additional tube 18 connects between one end of the reservoir 13 to the ink tank 16 for the return of ink from the reservoir 13. A pump 19 is positioned in the line 17 between the ink tank 16 and the ink reservoir 13, and a valve 20 is positioned in the tube 18 between the reservoir 13 and tank 16. Ink from the tank 16 enters the reservoir 13 through the tube 17.

FIGS. 6 and 7 show a more detailed view of the printer head 21. In the head 21 are included the plurality of pressure chambers 11 and nozzle channels leading to the nozzles 12 which are formed on both sides of the glass substrate 31 as described above. Ink is supplied through the tubes 17, 18 through the ink reservoir 13 which has a larger capacity than the pressure chambers 11 which are connected to the reservoir 13. As seen in FIG. 7, a glass plate 35 of the same thickness as the glass substrate 31 is placed along side the substrate 31. Then thin glass plates 36, 37 are bonded to the glass plate 35 and substrate 31 by fusing at the contacting surfaces. The thin glass plates 36, 37 serve as deflection plates to which the piezoelectric elements 15 are attached. The reservoir 13 is the volume which is defined by the glass plate 35, the glass substrate 31 and the glass plates 36, 37. The capacity of this reservoir volume is substantially large compared with that of the depressions for the pressure chambers 11 and for the nozzles 12 which have a depth of only ten to hundreds of microns after forming by chemical etching. The hydraulic resistance to fluid flow in the reservoir 13 is small as compared to the flow resistance in the other passages in the print head 21.

Additionally, a filter portion 39 is formed between the reservoir 13 and the pressure chambers 11 at the time that the nozzles 12 and chambers 11 are etched. These shallow grooves 39 eliminate the need for a filter per se to be positioned in the tubing 17 as in embodiments of the prior art. Thus, the mechanism is simplified by means of the grooves 39. The piezoelectric elements, not shown in FIGS. 6 and 7, are positioned adjacent to the pressure chambers 11 and when driven by electric pulses operate to eject ink as described above. To improve the replenishment of ink in the pressure chambers 11 and passages leading to the nozzles 12 after ink has been ejected, island-like projections 38 are provided at both the inlets and outlets of the oval pressure chambers 11. Thereby, ink entering the chambers 11 flows along the walls as shown by the arrow 40.

Figure 5:
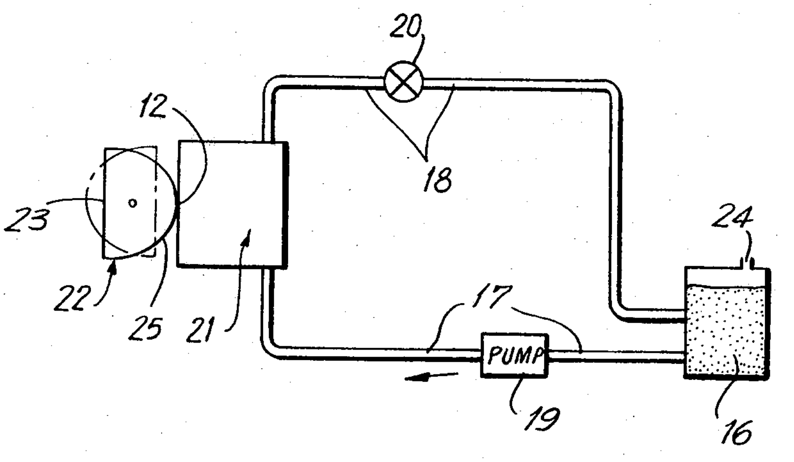
FIG. 5 is a schematic diagram similar to FIG. 3 and including a cap for the ink jet nozzles.

FIG. 5 is similar to FIG. 3 and further comprises a cap 22 which is made of rubber or the like. It is positioned against the front of the nozzles 12 when printing is stopped and serves to prevent clogging which may be caused by drying of ink in the nozzles 12. Several constructions for the cap 22 are suitable. In the embodiment of FIG. 5, the cap 22 is generally a semi-circular profile having a flat portion 23 and a curved portion 25. When printing is to start and also when ink is to be initially put into the print head or when changing the ink tank 16, the pump 19 is operated while the cap 22 is pressed closely against the nozzle openings 12. The valve 20 is generally kept open and with the pump 19 operating, ink circulates from the ink tank 16 through the head 21 passing through the reservoir 13 and returning to the ink tank 16 through the tubing 18. Therefore, bubbles in the tubes 17, 18 are forced into the ink tank 16 along with the circulating ink. The gas in the ink tank 16 is vented from the ink tank 16 through an exhaust hole 24. Thus, bubbles, in the tubes 17, 18, in the reservoir 13 are completely removed without wasting ink. Moreover, this circulation can also refresh the ink by the stirring action.

After the pumping procedure is completed with the cap 22 over the nozzles 12, the cap 22 is rotated to the position shown in FIG. 5 with the broken lines such that the flat section 23 faces the nozzles 12 and the ink may be freely ejected. The nozzles are completely exposed and in this condition the pump rotates and a portion of ink flows from the reservoir 13 to fill the pressure chambers 11 and the nozzles 12. Because bubbles have been completely removed from the ink by the first operation while the cap 22 is in place, the ejection of only a small quantity of ink from the nozzles 12 results in a full replenishment of ink in all of the passages of the head 21.

Then the head 21 is advanced to a printing position by a carriage mechanism. The valve 20 is kept open during printing and supplies ink from the ink tank 16 to the print head 21 through the tube 18. When minute bubbles remain in the vicinity of the pressure chambers 11 in the head 21 by chance even after the above two-step operation, and printing cannot be performed properly, or when clogging occurs at the tips of the nozzles 12 after excessively long periods of inactivity, the valve 20 is closed and the pump 19 is made to rotate. Thereby, the ink is pressurized and ejected rapidly from the tips of the nozzles 12 at a high pressure produced by the pump. In this way all difficulties caused by bubbles or clogging of the nozzles is eliminated.

The cap 22 also performs a cleaning function on the front of the nozzles 12 when it is rotated from its closed to its open positions. To assure this operation, the pump 19 is operated while the cap 22 rotates from the nozzles' closed position to the nozzles' opened position. The cap 22 rotates while the pump puts ink pressure on the nozzles 12 so that dust or nap is not forced by the cap 22 into the minute nozzle openings 12.

Generally in ink jet printing, especially in the ink on-demand jet printing, because the nozzles are minute and the ink ejection speed is relatively slow, minute dust particles and ink remnants tend to disburb the normal direction of the ink particle or droplet ejection. This has a bad effect on the printing quality. Accordingly, after excluding bubbles or dissolving clogged ink, it is not suitable to start printing in the condition just after ink has been ejected under pressure from the nozzles. Especially, in the multi-nozzle head 21 as shown in the figures of the present invention because the nozzles are very close to each other and ink collecting near the nozzles 12 is likely to affect operation. Consequently, the cleaning operation using the cap 22 of the present invention has a great and favorable effect on printing quality.

In summary, the serial operation cycle includes ink circulation for exclusion of bubbles with the nozzles closed; opening of the nozzles; ejecting a portion of ink from the nozzles; and closing of the valve downstream of the head 21 if bubbles come out of the nozzle or the nozzles are clogged. This procedure produces a desirable printing condition. However, it is not necessary to perform these steps every time that printing is to commence. If printing has been interrupted for a short time such that it is unlikely that bubble mingling has occurred since previous use, it is possible to resume printing with only a little prior ink circulation or with an actual omission of ink circulation.

It has been found desirable to circulate the ink using the pump in those situations when the printing head and ink supply system have been initially filled, when changing the ink tank, or when the printer head has received a physical shock which might dislodge bubbles which had previously been isolated within the system out of the flow stream and thereby not affecting print quality. The valve 20 is closed and the pump operated for situations where the bubbles are hard to circulate out of the system with the valve open, or when there is clogging of ink after a long term suspension of printing operations. Operating modes for elimination of bubbles can be established according to the conditions which can occur. For example, the operation mode can be selected automatically by a contained timer with the operation mode being selected dependent upon the duration of the period when no printing has occurred.

Figure 8:
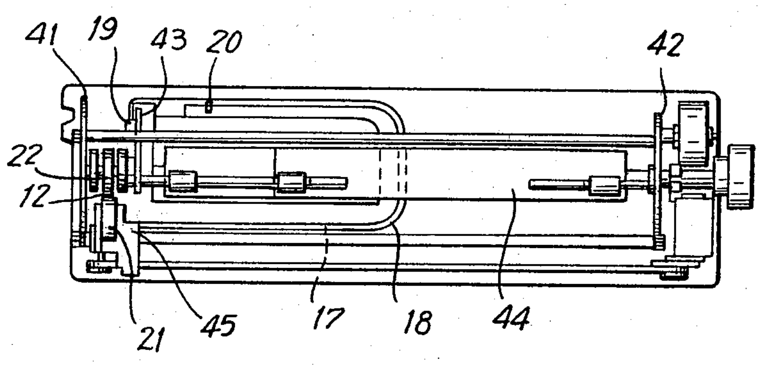
FIG. 8 is a printer including a print head and ink supply system in accordance with this invention.

A printing mechanism containing the print head and ink supply system, as described, is shown in FIG. 8. The printing mechanism includes side frames 41, 42, 43. A home position for the printer head 21 is set at the left side (FIG. 8) of the printing mechanism proximate the frames 41,43 between which are positioned the cap 22 mounted for rotation and the pump 19. The operations for removal of gas bubbles from the ink are performed when the print head 21 is at the home position. Printing is performed by moving a carriage 45 from the home position to a position in front of a platen 44 which is located between the side frames 42, 43. The head 21 is mounted on the carriage 45 and moves therewith. A pulley drive is indicated in FIG. 8 for the translation of the carriage 45. The tubings 17, 18 are flexible and maintain their connections with the print head 21 as the carriage 45 translates.

When printing is completed, the head 21 is returned to the home position at the left and the cap 22 is put in position to cover the nozzles 12. FIG. 8 shows the print head 21 in the home position with the cap 22 closing the nozzles 12. When printing data has not been received and printing has stopped for a long period of time, the head 21 is preferably returned to the home position and it is desirable that the cap 22 be put into position to seal the nozzle openings. Then the printer is always ready for immediate operation. In the embodiment of FIG. 8, the cap 22 is located out of the printing area, that is, the cap is located beyond the end of the platen 44. However, the cap 22 may be positioned on the carriage in front of the head 21. Then the circulation operation for removal of gas bubbles can be performed without relation to the position of the head as the carriage 45 translates.

Figure 4:
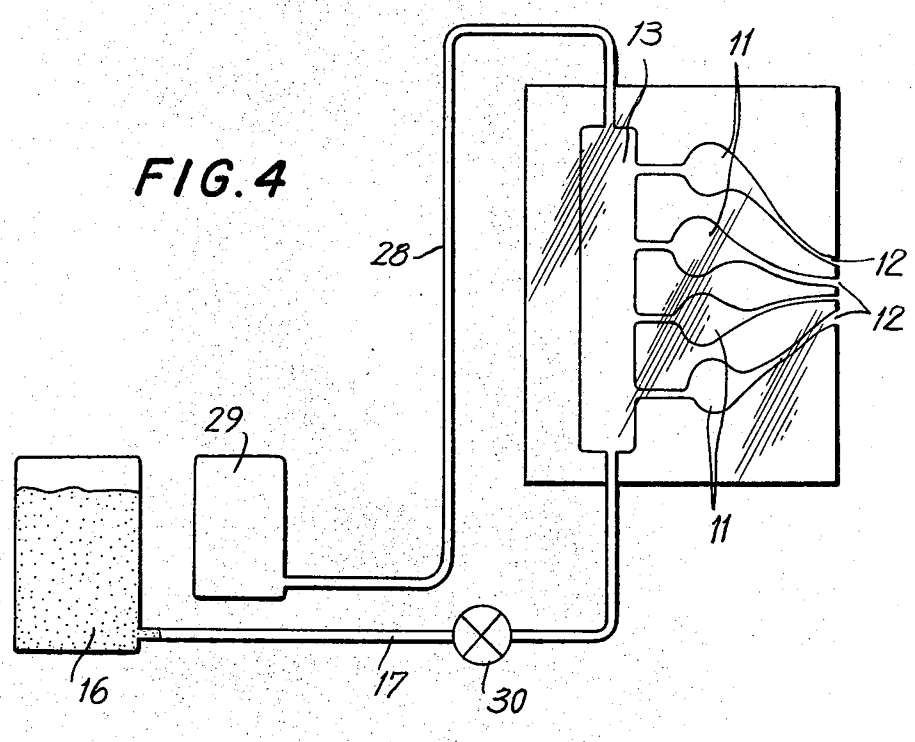
FIG. 4 is an alternative embodiment of an ink supply system and printer head in accordance with this invention.

Another embodiment of a print head with ink supply system is shown in FIG. 4. The construction of the head 21 including the pressure chambers 11, etc., is the same as the printer head of FIGS. 2, 3 and 7. Ink is supplied from the ink tank 16 to the ink reservoir 13 through the tube 17. Ink returns from the upper end of the reservoir 13 to a supplemental ink tank 29. A valve 30 is in the tubing 17 between the tank 16 and the ink reservoir 13. At the start of operations the supplemental ink tank 29 is empty. After the ink tank 16 is connected, applying pressure to the ink tank 16 and placing a cap (not shown in FIG. 4) over the nozzle openings 12 results in ink flowing from the tank 16 to fill the ink reservoir 13 and then to overflow ink into the supplemental ink tank 29. This flow of ink pushes bubbles from the reservoir into the tank 29. After sufficient ink has overflowed to the supplemental ink tank 29 to push all of the bubbles from the ink reservoir 23, the bubbles collect at the top of the supplemental tank 29. Then pressure is applied over the ink in the supplemental ink tank 29. Pressure can be applied, for example, by gas pistons in the tanks or pumps can be used. This pressure causes substantially all of the ink to return back to the main ink tank 16 passing through the reservoir 13.

Just before the completion of the operation of returning the ink from the supplemental tank 29 to the main ink tank 16, the valve 30 is closed in the tube 17 and the cap over the nozzles 22 is removed. Then ink flows simultaneously into the pressure chambers 11 and to the nozzles 12. Opening of the valve 30 places the printing in a ready condition for printing. If bubbles are formed or collect in the tube 17 or in the ink reservoir 13, for example, at the exchanging of the ink tank 16, or for some other reason, stable printing can be restored by performing the same operation. In this embodiment, as substantially all of the ink flowing into the supplemental ink tank 29 is returned back to the ink tank 16, little ink is wasted.

As described in the embodiments above, the printers in accordance with this invention provide for uniform high quality printing by removing bubbles in the ink supply channels by forced ink flow which avoids the containment of bubbles in the pressure chambers 11. Thus, problems which are fundamental and peculiar to ink on-demand jet printing are resolved and practical ink jet printing is possible. It should be understood that the use of the rotary pump, as described above as a means for eliminating air bubbles from the system, and the construction of the pump and valve mechanism do not limit the concepts of the present invention.

As described above, the present invention eliminates the disadvantage of the prior art ink on-demand type jet printers, that is, bubble entrapment. The present invention comprises an ink circulating system which extends from the ink tank through tubing to the head reservoir, through further tubing and a valve back to an ink tank. This structure can completely exclude bubbles from the system. Moreover, as a cap and cleaning means are integrally combined, construction is simple and the entire system has a greatly favorable effect on printing quality.

It will thus be seen that the objects set forth above, among those made apparent from the preceding description, are efficiently attained and since certain changes may be made in the above construction without departing from the spirit and scope of the invention, it is intended that all matter contained in the above description as shown in the accompanying drawings shall be interpreted as illustrative but not in a limiting sense.

It is also to be understood that the following claims are intended to cover all of the generic and specific features of the invention herein described, and all statements of the scope of the invention which, as a matter of language, might be said to fall therebetween.

What is claimed is:

1. An ink jet printer comprising:

a printer head including a substrate, a vibration plate, at least one pressure chamber and nozzle formed by providing a gap between said substrate and said vibration plate, each said pressure chamber being connected to one of said ink nozzles;

ink tank means for containing ink for printing;

a reservoir having an inlet and an outlet each said pressure chamber being connected by a channel to said reservoir for receiving ink from said reservoir, said ink reservoir having a low hydraulic resistance to fluid flow from said inlet to said outlet relative to the hydraulic flow resistance through said pressure chambers, channels and nozzles;

first tube means for connecting said ink tank means to said printer head inlet;

second tube means for connecting said printer head outlet to said ink tank means, ink flowing from said ink tank means passing through said ink reservoir from said inlet to said outlet to expel gas bubbles and return to said ink tank means without loss of ink.

2. An ink jet printer as claimed in claim 1, and further comprising means for impelling ink from said tank means through said printer head, whereby flow circulation and bubble purging is accelerated.

3. An ink jet printer as claimed in claim 2, and further comprising valve means for selectively opening and closing one of said first and second tube means.

4. An ink jet printer as claimed in claim 3, wherein said ink tank means is a tank, said first and second tube means being connected to said tank, said means for impelling being a pump.

5. An ink jet printer as claimed in claim 4, and further comprising selectively removeable cap means for selectively covering the outlets of said at least one nozzle.

6. An ink jet printer as claimed in claim 5, wherein said cap means is adapted for wiping said at least one nozzle as said at least one nozzle is uncovered.

7. An ink jet printer as claimed in claim 4, wherein said valve means is in said second tube means.

8. An ink jet printer as claimed in claim 7, and further comprising an air vent in said tank.

9. An ink jet printer as claimed in claim 3, wherein said ink tank means is at least a first and second tank, said first tube means being connected to said first tank and said second tube means being connected to said second tank.

10. An ink jet printer as claimed in claim 9, and further comprising means for impelling ink from said second tank through said second tube means and said printer head, whereby two directional flow through said head is possible.

11. An ink jet printer as claimed in claim 10, wherein said valve means is in said first tube means.

12. An ink jet printer as claimed in claim 1, and further comprising an end plate, and wherein said ink reservoir is formed by providing a space enclosed by said substrate, said vibration plate and said end plate.

13. An ink jet printer as claimed in claim 1, wherein said ink reservoir is formed by a gap between said substrate and vibration plate produced simultaneously with forming said pressure chambers.

14. A method for expelling gas bubbles from a printer head, said head including an inlet port, an outlet port, an ink reservoir and at least one discharge nozzle for ink flow, said inlet and outlet port being connected to said reservoir, said nozzle being connected to a pressure chamber, said pressure chamber being connected to said reservoir, comprising the steps of:

(a) blocking said at least one discharge nozzle by cap means;

(b) forcing ink under pressure through said head from said inlet port to said outlet port;

(c) releasing said blocking provided by said cap means until ink flows from said at least one nozzle.

15. A method as claimed in claim 14, and further comprising the step of (d) blocking said outlet port while said ink is forced and said at least one nozzle is unblocked.

16. A method as claimed in claim 14 or 15, and further comprising the step of collecting the ink discharge from said outlet port and returning said ink to a tank supplying said inlet port.

17. A method as claimed in claim 14, and further comprising the step of (d) wiping said at least one nozzle by said cap means while ink is flowing from said at least one nozzle.

18. An ink jet printer comprising:

a printer head including at least one pressure chamber, at least one nozzle communicating with said pressure chamber;

ink supply means for providing ink in said at least one pressure chamber;

cap means for capping and cleaning said nozzle, said cap means including a flat portion and a curved portion and being mounted for rotation between an open position and a closed position, said flat portion being spaced from the discharge opening of said nozzle when said cap means is in said open position, said curved portion pressing against said discharge opening of said nozzle and stopping said nozzle when said cap means is in said closed position, said curved portion wiping said discharge opening when rotating between at least one of said open and closed position and said closed and open position, whereby said nozzle may be sealed when printing is stopped, exposed to permit printing, and cleaned in the sealing and exposing process.

* * * * *